US008311546B2

(12) United States Patent
Boudreau et al.

(10) Patent No.: US 8,311,546 B2
(45) Date of Patent: Nov. 13, 2012

(54) MARINE COMMUNICATION DEVICE WITH WIRELESS CELLULAR TELEPHONE CONNECTIVITY

(75) Inventors: Wilfred Charles Boudreau, Mundelein, IL (US); James Richard Johnson, Boca Raton, FL (US); Robert Edward Mudra, Glenview, IL (US); Christopher Steven deWaal, Oakwood Hills, IL (US)

(73) Assignee: Cobra Electronics Corporation, Chicago, IL (US)

( * ) Notice: Subject to any disclaimer, the term of this patent is extended or adjusted under 35 U.S.C. 154(b) by 0 days.

(21) Appl. No.: 12/867,140

(22) PCT Filed: Feb. 9, 2009

(86) PCT No.: PCT/US2009/033568
§ 371 (c)(1),
(2), (4) Date: Aug. 11, 2010

(87) PCT Pub. No.: WO2009/102663
PCT Pub. Date: Aug. 20, 2009

(65) Prior Publication Data
US 2010/0311476 A1    Dec. 9, 2010

Related U.S. Application Data

(60) Provisional application No. 61/027,769, filed on Feb. 11, 2008.

(51) Int. Cl.
*H04W 40/00* (2009.01)
(52) U.S. Cl. ....... 455/445; 455/41.2; 455/501; 455/220; 455/550.1; 455/556.1; 455/151.4

(58) Field of Classification Search ................. 455/41.2, 455/501, 220, 445, 550.1, 552.1, 556.1, 151.4
See application file for complete search history.

(56) References Cited

U.S. PATENT DOCUMENTS 5,163,158 A * 11/1992 Tendler et al. ............... 455/11.1
(Continued)

FOREIGN PATENT DOCUMENTS
WO    WO 2009/102676 A1    8/2009

OTHER PUBLICATIONS

PCT International Search Report mailed on Apr. 7, 2009 for PCT/US2009/033568.

(Continued)

*Primary Examiner* — Kwasi Karikari
(74) *Attorney, Agent, or Firm* — Hitchcock Evert LLP

(57) ABSTRACT

A wireless communication device for use in a noisy or harsh environment in connection with a cellular telephone is disclosed. The wireless communication device provides enhanced audio broadcasting capabilities for an operator of the device by providing a larger, more powerful speaker than that typically found in a cellular telephone. The apparatus of the present invention improves cellular telephone usage in the typically noisy and harsh environment found while operating a boat. The present apparatus further provides a half-duplex mode of communication to further reduce ambient noise experienced while using a cellular telephone in a noisy environment In another embodiment, the apparatus is connectable to a variety of external devices and is capable of operating the external devices and providing internet access for a variety of external devices through a cellular telephone connection In at least one embodiment, the present invention is connectable to any transceiver.

31 Claims, 6 Drawing Sheets

U.S. PATENT DOCUMENTS

| | | | |
|---|---|---|---|
| 7,102,568 B1 * | 9/2006 | Newman et al. | 342/357.4 |
| 7,200,358 B1 * | 4/2007 | Newman et al. | 455/11.1 |
| 7,233,795 B1 | 6/2007 | Ryden | |
| D598,001 S | 8/2009 | Peng | |
| 2003/0083075 A1 * | 5/2003 | Miyazaki et al. | 455/456 |
| 2004/0048598 A1 | 3/2004 | Gagnon | |
| 2005/0020236 A1 | 1/2005 | Mauney et al. | |
| 2005/0277445 A1 | 12/2005 | Bae | |
| 2006/0058002 A1 | 3/2006 | Bachelder | |
| 2006/0116073 A1 | 6/2006 | Richenstein et al. | |
| 2007/0242834 A1 | 10/2007 | Coutinho et al. | |
| 2009/0029743 A9 * | 1/2009 | Lair et al. | 455/569.1 |
| 2009/0203319 A1 | 8/2009 | Sandoval et al. | |

OTHER PUBLICATIONS http://yaesu.com/indexVS/cfm?cmd=DisplayProducts&ProdCatID=106&encProdID=AF7E . . . , May 1, 2009, 3 pages.

http://www.yaesu.com/indexVS.cfm?cmd=DisplayProducts&ProdCatID=111&encProdID=. . . , May 1, 2009, 2 pages.

Ranger Professional PPR-RBT1, photo of product package, Aug. 25, 2009, 1 page.

PCT International Search Report mailed on Mar. 27, 2009 for PCT/US09/33610.

* cited by examiner

MARINE COMMUNICATION DEVICE WITH WIRELESS CELLULAR TELEPHONE CONNECTIVITY

CROSS-REFERENCE TO RELATED APPLICATION

This application claims the benefit of priority from U.S. Provisional Application No. 61/027,769 filed on Feb. 11, 2008.

FIELD OF THE INVENTION

The present invention relates generally to a marine communication device having wireless connectivity, such as by Bluetooth technology or other wireless standard, to a cellular telephone which is in turn connected to the cellular telephone network. The operator of the marine communication device is therefore able to place and receive cellular telephone calls while taking advantage of the more powerful microphone and speaker units associated with the marine communication device or communication devices for other noisy environments.

BACKGROUND

Communication from a boat traditionally was accomplished via a ship-borne marine VHF radio operating in the frequency range between 156 and 162 MHz. With the advent and widespread use of cellular telephones, smart phones, or other devices which communicate on the cellular telephone network, much of the communication between a boat and the shore may now be accomplished via cellular telephone. While this technology is not appropriate for large, ocean-going vessels which may frequently be outside the range of a cellular telephone, for many recreational boat users, cellular telephone communication may be the preferred method.

A significant disadvantage of cellular telephone communication while on board a boat is noise. While use of a cellular telephone in the relative quiet of a building or enclosed road-going vehicle may be satisfactory, noise levels on an unenclosed, moving boat or in other noisy environments may far exceed the noise levels of a building or enclosed vehicle and overwhelm the capabilities of a cellular telephone. Noise associated with the boat's engine, the rush of wind and the splash of water may make communication difficult as the person on the boat or in other noisy environments may be unable to hear the person to whom they are speaking, while their own communication may be drowned out on the receiving end. More specifically, because cellular telephones generally operate in a duplex mode, meaning that audio signals are able to be transmitted both ways simultaneously, noise from the boat is continuously broadcast, cluttering up the communication signal and impeding conversation. Similarly, the noisy environment of the moving boat may make it difficult to even hear the ring of a cellular telephone.

A further disadvantage of cellular telephone use while on board a boat is the environmental hazards to which the telephone may be subjected. In particular, cellular telephones are generally not designed with marine applications in mind. Therefore, they may not be particularly well suited to withstand the increased humidity associated with boating, to say nothing of the corrosive salt air experienced in near-shore, oceanic boating or weather damage caused by ultraviolet rays resulting from prolonged exposure to sunlight. Furthermore, because many recreational boats are not enclosed, a cellular telephone used on a boat may experience rain to a degree not normally expected. Furthermore, cellular telephones used on a boat may be exposed to water from spray associated with the moving boat, or operators with wet hands from swimming or fishing, or the cellular phone may even be dropped overboard. In short, because the cellular telephone may not be able to ring loudly enough, or broadcast a conversation loudly enough to be heard, an operator typically must place the cellular telephone in a location that is easily accessible to maximize his or her ability to hear it. Unfortunately, this placement may also coincide with a location that puts the cellular telephone at greatest risk from the dangers discussed above.

In addition, other environments are known to experience the same or similar disadvantages to cellular telephone use such as noise, weather, and the potential for accidents. These environments can include various farm equipment (i.e. tractors, harvesters, etc.), construction equipment (i.e. cranes, dump trucks, front loaders, etc.), off-road vehicles (i.e. jeeps, four-wheelers, etc.), automobiles, private aircraft, and various buildings (i.e. factories, manufacturing plants, power plants, etc.).

Therefore, it is desirable to provide a communication system that has the advantages of cellular telephone communication, while eliminating the disadvantages associated with using a cellular telephone on board a boat or in other noisy or harsh environments.

SUMMARY OF THE INVENTION

It is an object of the present invention to provide a communication device that is wirelessly connectable to the cellular telephone network, and thereby enables a boat operator or passenger to use a cellular telephone, smart phone, or other devices which communicate on the cellular telephone network, while on board a boat.

It is another object of the present invention to provide a communication device that is wirelessly connectable to a cellular telephone and which is weather resistant or even waterproof such that it may be used on board a boat.

It is another object of the present invention to provide a communication device that is wirelessly connectable to a cellular telephone and which may be operated in half-duplex mode thereby preventing the person speaking to the operator of the communication device from hearing the boat noise while the person is speaking.

It is yet another object of the present invention to provide a communication device that is wirelessly connectable to a cellular telephone and which may provide audio broadcasting capabilities which are superior to the cellular telephone.

It is yet another object of the present invention to provide a communication device which is operable from an on-board power source.

It is yet another object of the present invention to provide a communication device which may be integrated into a boat's audio system such as a stereo or marine radio for cellular telephone audio.

It is yet another object of the present invention to provide a communication device which has an easy to use interface and which uses an existing cellular telephone to make and receive calls.

It is yet another object of the present invention to provide a communication device which may store and retrieve phone numbers and other data, including but not limited to names, type of phone, etc.

It is yet another object of the present invention to provide a communication device which is enabled to provide and display diagnostic information including but not limited to battery condition and cellular signal strength.

It is yet another object of the present invention to provide a communication device which is enabled to perform functions as supported by the wireless standard on which it is operating, such as providing and displaying information, including but not limited to voicemail indications, text message and e-mail indications, and to display text messages and e-mails.

It is yet another object of the present invention to provide a communication device which is operatively connectable to other voice enabled devices and is operable as a microphone for such devices, including but not limited to communication devices, radio devices, and devices with voice activated functions, such as navigation devices, chart plotters, depth finders, and the like.

It is yet another object of the present invention to provide a communication device which can be paired with cellular phones and will select pairing based on a priority.

It is yet another object of the present invention to provide a communication device that is connectable to the cellular telephone network through a wireless connection to a cellular telephone, smart phone, or other device which communicates on the cellular telephone network, and thereby enables communication through the cellular telephone network in noisy environments.

It is yet another object of the present invention to provide a communication device that is connectable to the cellular telephone network through a wireless connection to a cellular telephone, smart phone, or other device which communicates on the cellular telephone network, which can act as a hub to provide internet access to other devices (i.e. navigation devices, chart plotters, computers, weather monitoring devices, etc.) through the cellular telephone network.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description. Furthermore, the figures shown are specific to only one particular embodiment of the communication device described. However, the present invention is applicable to any number of communication devices, and the particular circuitry and embodiments illustrated should not be taken as a limitation of the present invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
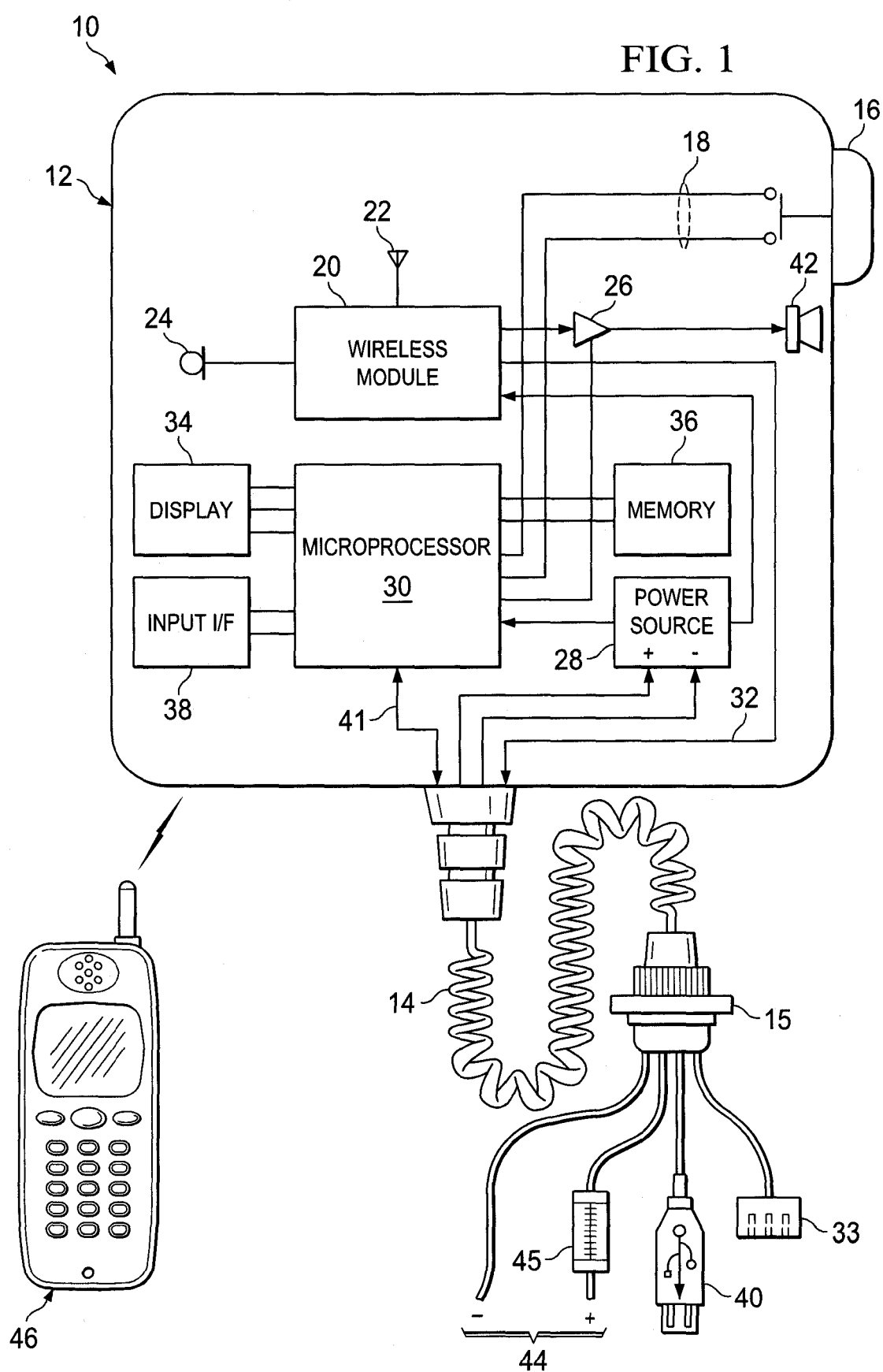
FIG. 1 is a block diagram depicting the layout of the communication device of the present invention.

With reference to FIG. 1, a communication device 10 for wirelessly communicating with a cellular telephone is shown according to the principles of the present invention. However, it will be understood that the scope of the present invention should not be limited to this particular wiring architecture.

Communication device 10 is comprised of case 12 and, in the embodiment shown, cord 14, although in alternate embodiments, cord 14 may be eliminated and the functionality associated with the cord described below located within case 12. As shown in FIG. 1, switch 16 is interposed within case 12 such that an operator may depress or otherwise activate switch 16 without the need for opening case 12. In a preferred embodiment, case 12 is weather hardened or waterproof, such that it is able to operate in a marine environment. In other embodiments, case 12 may be designed to withstand other conditions (i.e. high and low temperatures, exposure to ultraviolet light, airborne particulate matter, etc.) such that it is operable in a multitude of environments.

The circuitry comprising the depicted embodiment of the present invention includes leads 18 which when completed by switch 16 send an electrical signal to microprocessor 30. Wireless module 20 may comprise a Bluetooth® module, a ZigBee® module, Infra Red module, or an 802.11, Wi-Fi, or WiFimax module of various types known in the art, although use of alternative wireless standards would not deviate from the scope of the invention. In a preferred embodiment, wireless module 20 is a Bluetooth module. Wireless module 20 is operatively connected to antenna 22, microphone 24, amplifier 26, power source 28, microprocessor 30, and audio leads 32. Microprocessor 30 is in turn operatively connected to amplifier 26, display 34, which may be a liquid crystal display or other type of known display, memory unit 36, and input interface 38, which may be a keypad or other known user-operable interfaces. In the embodiment shown, microprocessor 30 is also operatively connected to a wired data connection 40. Wired data connection 40 may be used to input data into communication device 10 such as modifying the operating software used by communication device 10. In a preferred embodiment, wired data connection 40 operates on the known Universal Serial Bus ("USB") standard, although use of other communications standards such as I²C, Ethernet, CAN, and/or NEMA would not deviate from the scope of the invention. Speaker 42 is also located within case 12, and is operatively connected to amplifier 26. In another embodiment, the interface is operable to display and control the functions of the cellular telephone, smart phone, or other device to the extent supported by the relevant wireless standard, including but not limited to, volume, text messaging, voicemail, internet access, e-mail, and streaming music. The interface may comprise any number of switches used by the device.

Cord 14 is used primarily to transmit power between power supply 28 and a source 44 such as the electrical system of a boat. Source 44 will be a 12 volt source that is connectable to cord 14 via a plug, such as a 12 Volt DC accessory plug (commonly referred to as a cigarette lighter plug), although operating the communication device on a different power level would not deviate from the scope of the invention. In the embodiment shown in FIG. 1, cord 14 also is used to operatively extend audio leads 32 so that they may be connected to an appropriate audio reproducing device (not shown). Finally, cord 14 is also depicted as extending data connection 40, although, as with audio leads 32, it could terminate on or at case 12 without deviating from the scope of the invention. As shown, cord 14 terminates in a thru-hull connection 15, although alternative connections would not deviate from the scope of the invention. Cord 14 may be hardwired into source 44 or may include an operatively removable plug-in that can allow the communication device to be portable.

Figure 2:
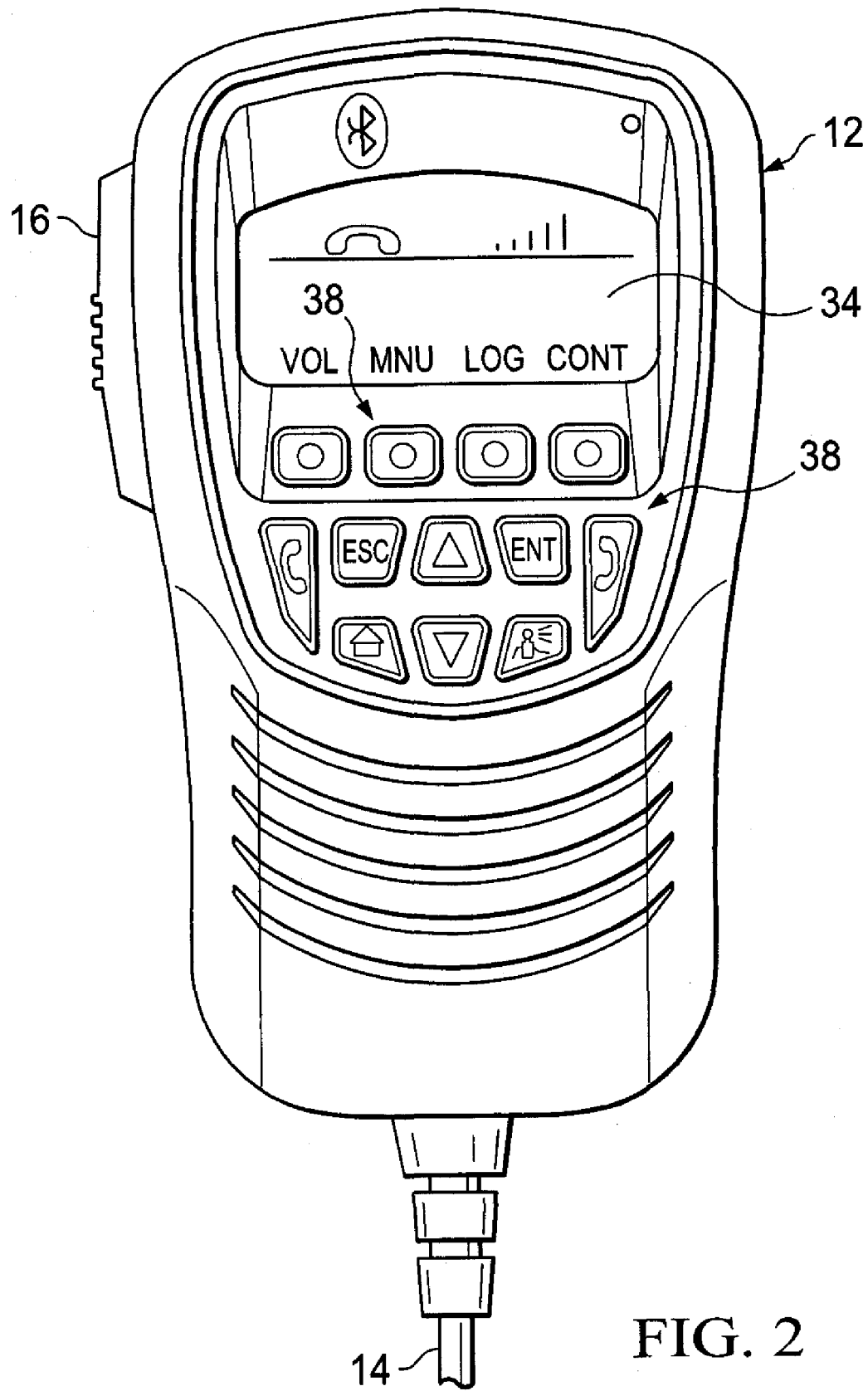
FIG. 2 is a view of the front of one embodiment of the communication device of the present invention.

Turning to FIG. 2, various features discussed in relation to FIG. 1 are again depicted. In particular, case 12, cord 14, and switch 16 are all shown. Similarly, display 34 and several embodiments of input interface 38 are also shown. It should be understood that the data shown on display 34, and the particular arrangement of keys in input interface 38, are for illustration purposes, and should not be taken as a limitation of the present invention.

Figure 3:
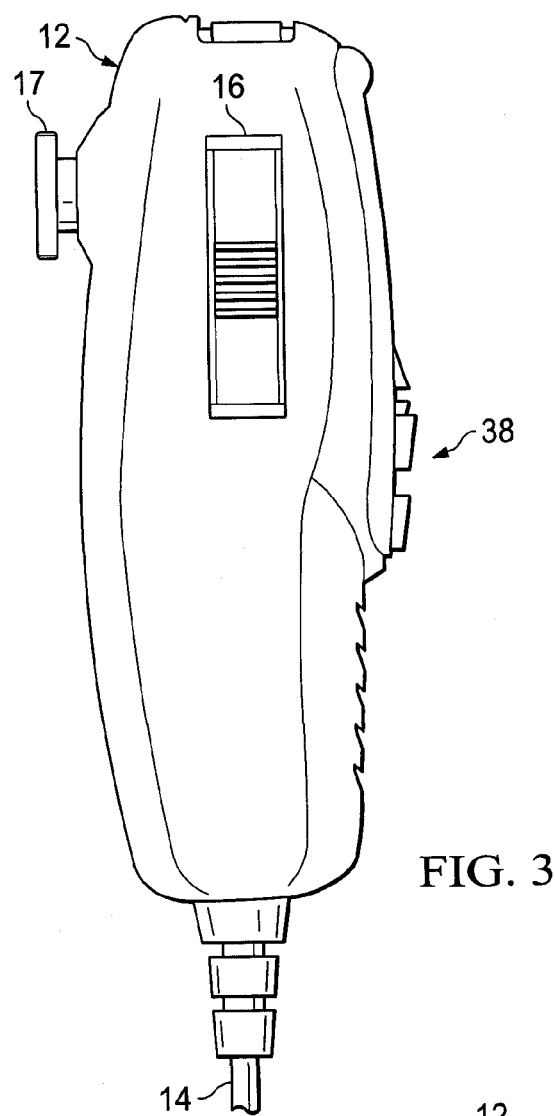
FIG. 3 is a side view of one embodiment of the communication device of the present invention.

FIG. 3 similarly depicts a side view of case 12, cord 14, switch 16, microphone hanger 17, and input interface 38.

Figure 4:
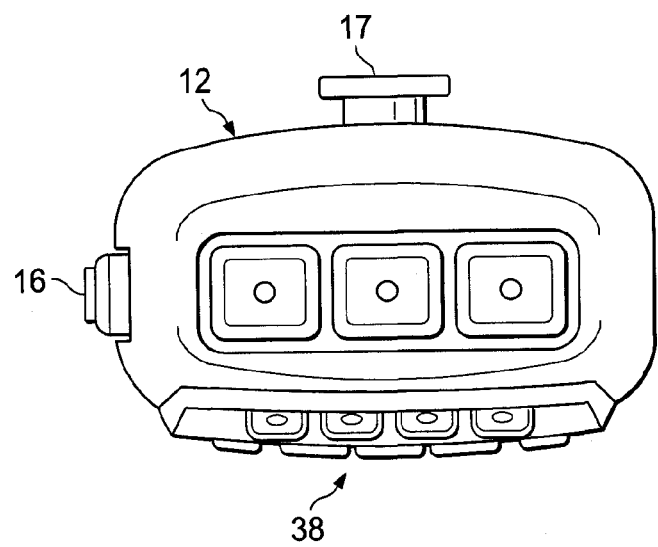
FIG. 4 is a top view of one embodiment of the communication device of the present invention.

Finally, FIG. 4 depicts a top view of case 12, switch 16, microphone hanger 17, and input interface 38.

Returning to FIG. 1, in operation, communication device 10 will be in wireless communication with a cellular telephone 46 via wireless module 20. Cellular telephone 46 must be one of a known type of cellular telephones which incorporate wireless connectivity with similarly compliant devices. As one having skill in the art will recognize a smart phone or any other device which connects to the cellular telephone network or a similar wireless network may be used along with or in place of cellular telephone 18. Accordingly, the term cellular telephone includes all devices which connect to the cellular telephone network or a similar wireless network such as a WiFi, Zigbee, or satellite network. A common standard for this type of communication, although not a limitation of the present invention, is Bluetooth® and is well known in the art. When cellular telephone 46 receives a call, a signal is sent by the short range wireless transceiver within cellular telephone 46 and is detected by wireless module 20. Wireless module 20 and cellular telephone 46 may then begin communication. It should be understood that in the example just given, cellular telephone 46 will have been paired with wireless communication device 10 at some point in the past. Pairing of cellular telephones with wireless devices over wireless connections utilizing, for example, the Bluetooth® standard is well known in the art. In a preferred embodiment, the communication device can be paired with multiple cellular telephones, smart phones, and other devices connected to the cellular network and will select between such devices based on priority.

When wireless module 20 receives a communication, it transmits an electrical signal to amplifier 26, where the electrical signal is amplified and passed on to speaker 42, where the electrical signal is converted to an auditory signal such that it may be heard by the operator. The communication received by wireless module 20 could take any number of forms. For example, the communication could be a voice transmission occurring as a part of a telephone conversation. Alternatively, the signal could be a ring signal received from cellular telephone 46, indicating that a call is incoming. A ring tone could then be broadcast by speaker 42, alerting an operator that a telephone call is incoming. The operator would then have the option to answer the call, either on the face of the telephone, or, in some embodiments of the present invention, through the input interface on the communication device 10.

Once a call had been connected, and communication was established through communication device 10, the operator may listen to the conversation through speaker 42. Because speaker 42 is physically larger than the speaker associated with cellular telephone 46, and because both speaker 42 and amplifier 26 are powered by a more robust power source 44, which could be, for example, the 12 volt power source associated with the boat in which communication device 10 is located, speaker 42 will generally be capable of broadcasting the audio signal at a much greater volume than would the speaker associated with cellular telephone 46.

When an operator is ready to transmit an audio signal, the operator first presses switch 16 which enables talk mode. As one skilled in the art will recognize, switch 16 may be any type of sensor, including but not limited to a voice activation sensor, inertial sensor, variable sensor, touch sensor, or button including the push-to-talk button commonly found on VHF or citizens band radios. In a preferred embodiment, communication device 10 operates only in half-duplex (sometimes referred to as simplex) mode. That is, communication device 10 will allow communication in only one direction at a time. Thus, at one time, communication device 10 will only either demodulate the incoming broadcast signal's audio over speaker 42, or will modulate the audio signal received from microphone 24 sending it wirelessly to cellular phone 46. By operating in half duplex mode, communication device 10 is able to reduce ambient noise broadcast during the communication, particularly when the non-operator of communication device 10 is speaking.

Once switch 16 has been activated, the operator may begin speaking into microphone 24. The operator's auditory input is converted to an electrical signal by microphone 24 and then broadcast by wireless module 20 to cellular telephone 46 where cellular telephone 46 transmits it along the cellular network as is well known. Thus, all communication between the operator aboard a boat using communication device 10 is accomplished using short range wireless technology and well known cellular telephone technology. Communication does not occur over the recognized marine spectrum, generally 156 to 162 MHz.

Operation of wireless module 20 is controlled by microprocessor 30, specifically controlling whether wireless module 20 is transmitting or receiving, depending on whether switch 16 has been depressed or not. Microprocessor 30 is also used to receive input from input interface 38, store and receive information from memory 36, and display information on display 34. Input interface 38 may take any one of a number of configurations. As shown in FIG. 2, in the embodiment shown, a number of hard keys and soft keys are represented. Input interface 38 may be configured to accept a wide range of inputs and to perform a wide range of functions including, but not limited to, accepting numeric inputs (such as telephone numbers), controlling volume, controlling menu functions, accepting and disconnecting calls, checking voice mail, and the like. Similarly, display 34 may be used to display a wide range of information, such as the state of communication device 10, caller identification, number dialed, duration of call, stored telephone numbers, text messages, e-mails, streamed music, and the like.

Memory 36 may be a non-volatile memory used to store user preferences, telephone numbers and the like. Antenna 22 is used to facilitate transmission and reception of wireless signals by wireless module 20. Power source 28 provides power to microprocessor 30, wireless module 20 and amplifier 26, although variations of these connections, such as directly connecting amplifier to a boat's 12 volt source, would not deviate from the scope of the invention.

In the embodiment depicted, communication device 10 is equipped with a data connection 40. However, this connectivity is not required, and alternate embodiments may exclude this element without departing from the scope of the invention. In this embodiment, data connection 40 is a USB connection which terminates at microprocessor 30 via data lead 41, and which could allow a user to upload data to communication device 10 such as telephone directory information, or could be used by the factory or a technician to upload operating software to communication device 10.

Similarly, in the embodiment depicted in FIG. 1, communication device 10 is equipped with audio leads 32. Audio leads 32 are not required for practicing the invention, and in alternate embodiments may be omitted. In the pictured embodiment, audio leads 32 terminate at a connector 33 for transmission of left and right channels of an audio broadcast. Connector 33 may be any type of connector for audio broadcasting, including but not limited to a three circuit female connector. In this embodiment, connector 33 may be placed in operative connection with an existing audio unit with complementary connecting devices. For example, many marine entertainment radios and stereo systems already in use on boats come equipped with an auxiliary jack for audio connections. By connecting connector 33 to such a device, an operator may be able to gain additional benefits from utilizing the even larger speaker associated with a marine entertainment radio or stereo versus the speaker present in communication device 10.

Finally, power is supplied from power supply 44 via cord 14 to communication device 10. In the embodiment depicted, fuse 45 is interposed between power source 44 and power source 28 to protect the system's power source 44 from excess current draw or fault in device 10.

Figure 5:
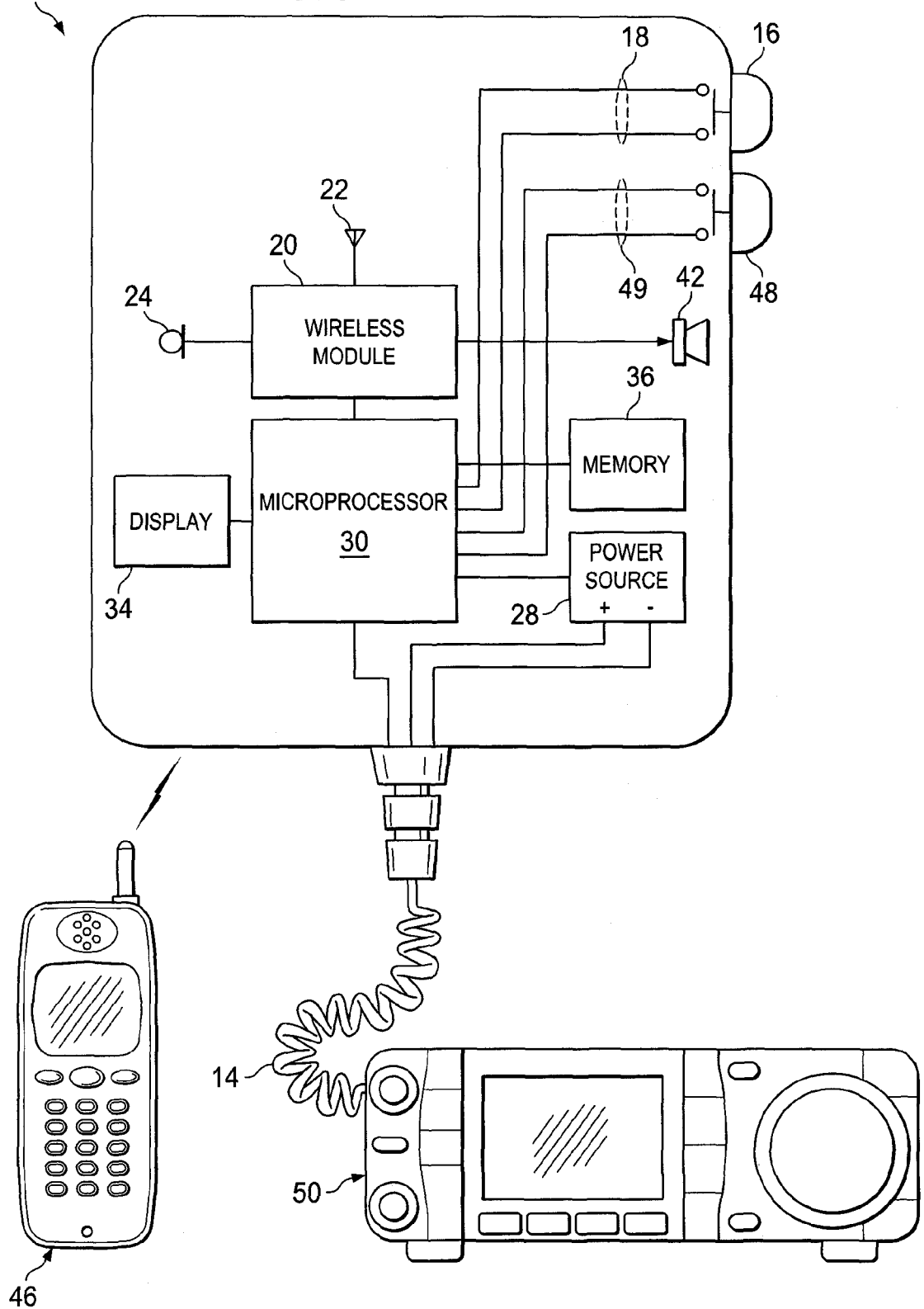
FIG. 5 is a block diagram depicting the layout of another embodiment of the communication of the present invention.

In the embodiment shown in FIG. 5, the communication device 52 is shown operatively connected to a radio 50 and including a second switch 48. When switch 48 is activated, leads 49 are completed to send an electrical signal to microprocessor 30. The communication device 52 is connected by cord 14 to radio 50, which in a preferred embodiment is a VHF marine radio. Cord 14 may be hardwired into radio 50 or by a removable connection. Communication device 52 may receive power from radio 50 through cord 14 or may rely on internal power source 28. In addition, connection to radio 50 may be used to charge power source 28.

In this embodiment, the first switch 16 is used in the same manner described in FIG. 1 and second switch 48 is used to select between cellular telephone mode and radio mode. For example, when switch 48 is pressed once, communication device 52 may enter cellular telephone mode, wherein microphone 24 and speaker 42 are used to facilitate communication through a cellular telephone 46 via the wireless connection by wireless module 20. When switch 48 is depressed a second time, communication device 52 may enter radio mode, wherein microphone 24 and speaker 42 are used to facilitate communication through the radio bandwidth compatible with radio 50.

Display 34 may indicate the current mode of the communication device 52 and may show additional information provided from each device, such as battery levels, signal strength of cellular telephone 46, indications of voice and text messages, and the current frequency of radio 50. During cellular telephone mode, display 34 may be used to retrieve and show text messages, e-mail, photographs, interne websites, and streaming music.

In some embodiments, communication device 52 can operate the functions of radio 50 using switches 16 and 48 through the connection over cord 14. In turn, communication device 52 can also operate the functions of cellular telephone 46 using switches 16 and 48 through the wireless connection. As one skilled in the art will recognize, a single switch may be used to control the functions of communication device 52. For example, a single click may control one function while double clicking the same switch may control a second function and so forth. Alternatively, multiple switches may be used for communication device 52 and when using multiple switches, each may be a different type of switch (i.e. one depression switch, one inertial switch, one voice activated switch, etc.).

Figure 6:
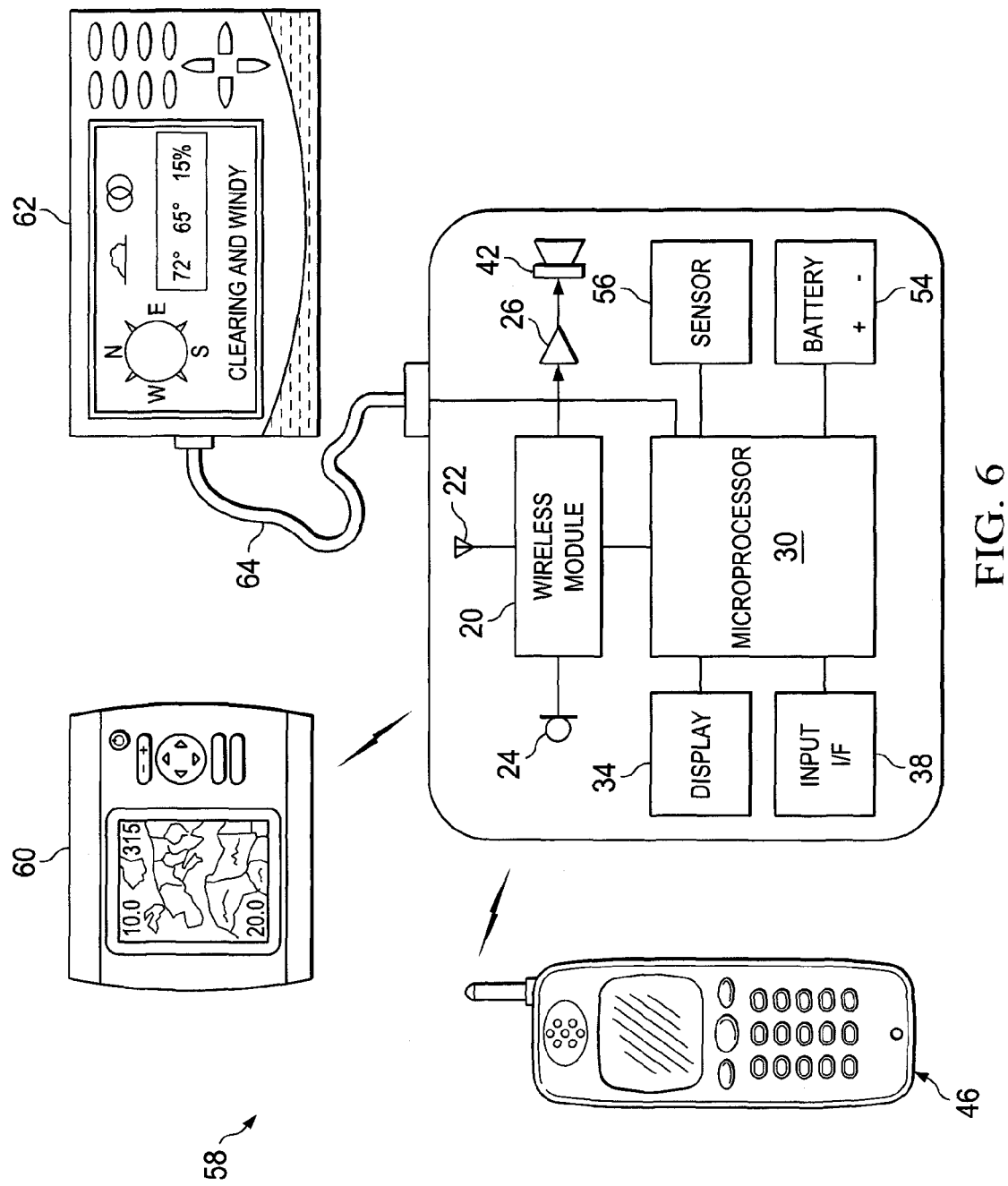
FIG. 6 is a block diagram depicting the layout of another embodiment of the communication device of the present invention.

FIG. 6 shows another embodiment of the present invention in the form of a portable wireless communication device 58. This embodiment shows battery 54 as a power source and utilizes sensor 56 to control the operation of communication device 58. Sensor 56 is a voice activated switch. As one skilled in the art will recognize, sensor 56 may be any type of switch or sensor (i.e. voice activation sensor, inertial sensor, variable sensor, touch sensor, or button) and remain within the scope and spirit of the invention.

In addition, FIG. 6 shows communication device 58 as a wireless hub for external devices including cellular telephone 46, chart plotter 60, and weather monitor 62. Communication device 58 acts as a wireless hub by providing internet access through the cellular telephone network by operatively connecting to a paired cellular telephone 46. As one skilled in the art will recognize, cellular telephone 46 could also be a smart phone or other device which communicates on the cellular telephone network and remain within the scope and spirit of the invention. In this embodiment, cellular telephone 46 is one of the many known varieties of cellular phones that are able to connect to the internet. In this embodiment, communication device 58 connects to the cellular network as described above by connecting to cellular telephone 46 via a wireless connection such as Bluetooth® by wireless module 20. Once connected to the cellular network, communication device 58 can access the internet and provide access to other operatively connectable devices.

For example, FIG. 6 shows a weather monitor 62 connected to communication device 58 via cord 64 and a chart plotter 60 connected wirelessly to communication device 58. In this embodiment, chart plotter 60 would be Bluetooth® compatible to wirelessly connect to wireless module 20. Chart plotter 60 could then transmit to and receive information from the internet by wireless signal to communication device 58 which is in turn transmitted wirelessly to cellular telephone 46 and to the internet. The functions of chart plotter 60 and weather monitor 62 can be operatively controlled using sensor 56 of communication device 58 or may be controlled using each device's own interface. In other embodiments, devices that utilize communication device 58 as a wireless hub may include but are not limited to navigation devices, chart plotters, weather monitoring devices, depth finders, and computers.

Figure 7:
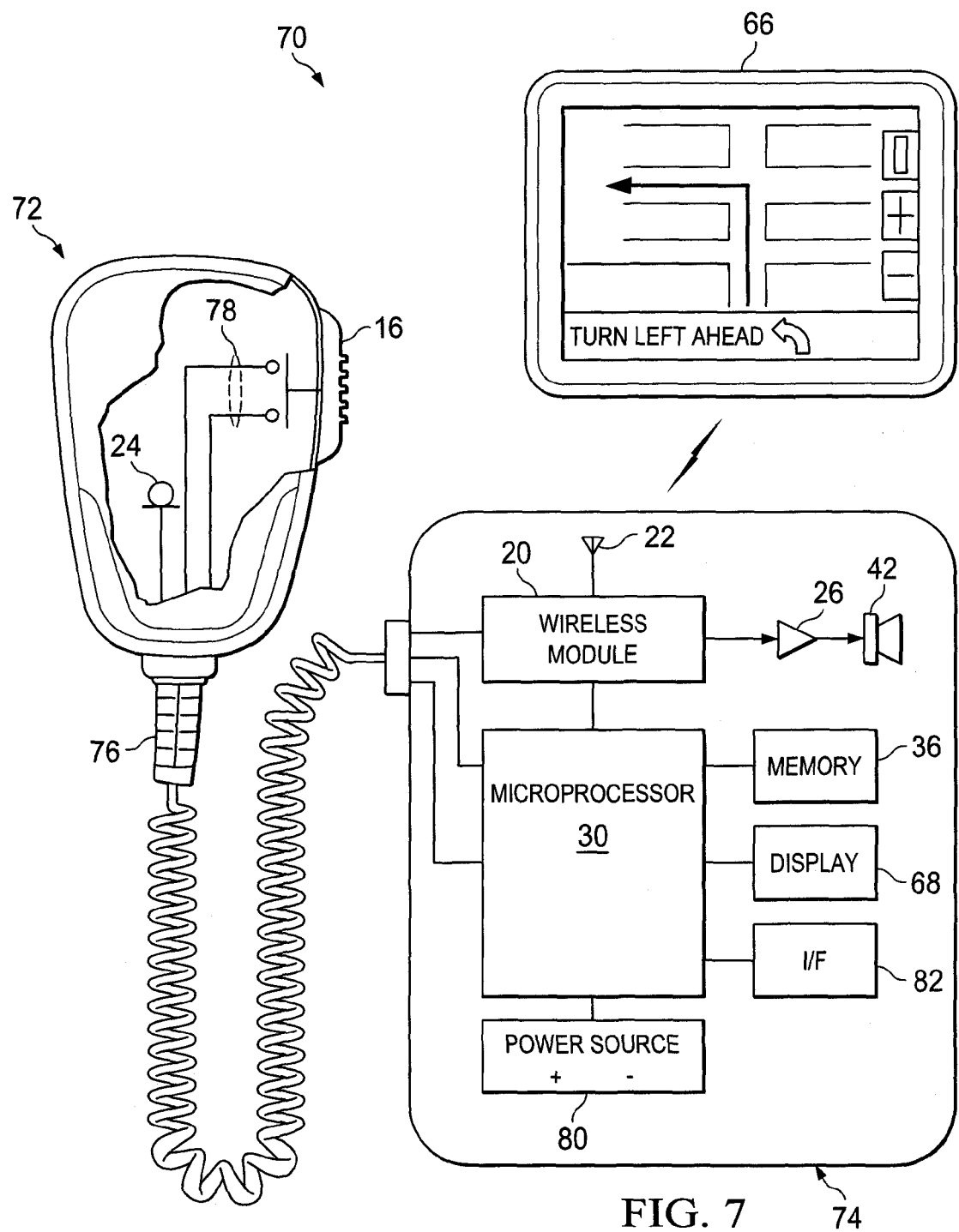
FIG. 7 is a block diagram depicting the layout of another embodiment of the communication device of the present invention.

In another embodiment, FIG. 7 depicts communication device 70 having a handset 72 and a console unit 74 connected by cord 76. Handset 72 contains microphone 24 and switch 16. Leads 78 send an electrical signal to microprocessor 30 when switch 16 is depressed. In this embodiment, console unit 74 contains microprocessor 30 operatively associated with power source 80, display 68, memory 36, interface 82, wireless module 20, amplifier 26, and speaker 42. The case of console unit 74 is weather resistant construction to protect the circuitry from the elements of the environment.

FIG. 7 also depicts a navigation unit 66 that uses at least one voice activation sensor. In this configuration, navigation unit 66 is Bluetooth® compatible and is in wireless communication with wireless module 20 of communication device 70. Communication device 70 receives voice commands into microphone 24 and transmits the commands to the navigation unit 66 wirelessly. In this embodiment, communication device 70 acts as a voice input for navigation unit 66 and any other devices in operative connection. Display 68 may be used to indicate what other devices are in operative connection with communication device 70 and which device is currently in use. In some embodiments, switch 16 may be used to select which device is in use, while in other embodiments, selection of the device may occur through interface 82. As one skilled in the art will recognize, any number of configurations for selecting devices may be used and all remain within the scope and spirit of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A marine communication device with wireless cellular telephone connectivity comprising:
   a microprocessor;
   a wireless module;
   a speaker;
   a microphone; and
   a switch, wherein said switch is operable to select between a radio mode and operation of said wireless module;
   wherein said wireless module is operable to wirelessly communicate via a wireless module communication with a cellular telephone and said speaker and said microphone may be used in connection with a cellular communication conducted via said cellular telephone, wherein said wireless module lacks a capability to directly communicate via said cellular communication, wherein said wireless module communication differs from said cellular communication, and wherein said radio mode is operable independent from said wireless module communication and said cellular communication.

2. The marine communication device of claim 1 operable to transmit and receive via said cellular communication in half-duplex mode.

3. The marine communication device of claim 1 further comprising a case which is weather resistant.

4. The marine communication device of claim 1 wherein said wireless module utilizes the Bluetooth standard for the wireless module communication.

5. A marine communication device with wireless cellular telephone connectivity comprising:
   a microprocessor operatively associated with a speaker, a microphone, at least one switch, and a wireless module, wherein said wireless module is operable to wirelessly communicate via a wireless module communication with at least one cellular telephone and said speaker and said microphone may be used in connection with a cellular communication conducted via said cellular telephone, wherein said wireless module lacks a capability to directly communicate via said cellular communication, and wherein said wireless module communication differs from said cellular communication; and
   a transceiver; wherein said at least one switch is in operative association with said microphone and operable to select between wirelessly communicating and transmitting via said cellular communication via said cellular telephone or a transceiver communication via said transceiver, wherein said transceiver communication differs from said wireless module communication and said cellular communication.

6. The marine communication device of claim 5 wherein said transceiver is a VHF Marine radio.

7. The marine communication device of claim 5 operable to transmit and receive communication in half-duplex mode.

8. The marine communication device of claim 5 further comprising at least one case which is weather resistant.

9. The marine communication device of claim 5 wherein said wireless module utilizes the Bluetooth standard for said wireless module communication.

10. The marine communication device of claim 5 further comprising an interface wherein said interface is operatively associated with said transceiver when said at least one switch operatively selects said transceiver communication via said transceiver and wherein said interface comprises controls for at least one function of said transceiver.

11. The marine communication device of claim 5 further comprising an interface wherein said interface is operatively associated with said cellular telephone when said at least one switch operatively selects said cellular communication via said cellular telephone and wherein said interface comprises controls for at least one function of said cellular telephone.

12. The marine communication device of claim 5 wherein said marine communication device is operatively connectable to at least one external speaker.

13. The marine communication device of claim 5 wherein said microphone is further used in connection with said transceiver communication via said transceiver.

14. A communication device with wireless cellular telephone connectivity comprising:
   a microprocessor;
   a wireless module;
   a speaker;
   a microphone; and
   at least one user interface;
   wherein said microprocessor is operatively associated with said wireless module, said speaker, said microphone and said user interface; and wherein said wireless module is operable to wirelessly communicate via a wireless module communication with at least one external device and said speaker and said microphone may be used in connection with an external device communication conducted via said external device, wherein said wireless module lacks a capability to directly communicate via said external device communication, wherein said communication device is operable to select between wirelessly communicating and transmitting via said external device communication or a transceiver communication, wherein said wireless module communication differs from said external device communication and from said transceiver communication, and wherein said external device communication differs from said transceiver communication.

15. The communication device of claim 14 operable to transmit and receive communication in half-duplex mode.

16. The communication device of claim 14 further comprising a case which is weather resistant.

17. The communication device of claim 14 wherein said wireless module utilizes the Bluetooth standard for said wireless module communication.

18. The communication device of claim 14 further comprising an external power source and a cord, wherein said cord is operatively associated with said external power source and operatively connected to said communication device.

19. The communication device of claim 18 further comprising an internal power source, wherein said cord is operatively associated with said external power source and operable to charge said internal power source.

20. The communication device of claim 14 wherein said at least one external device comprises at least one cellular telephone.

21. The communication device of claim 20 wherein said user interface is operable to execute functions of said at least one cellular telephone.

22. The communication device of claim 20 further comprising at least one additional external device, wherein said wireless module is operable to wirelessly communicate with said at least one additional external device, wherein said communication device can receive communications from said at least one additional external device and transmit said communications via said wireless module communication to said at least one cellular telephone.

23. The communication device of claim 20 further comprising at least one additional external device, wherein said wireless module is operable to wirelessly communicate with said at least one additional external device, wherein said communication device can receive communications via said wireless module communication from said at least one cellular telephone and transmit said communications to said at least one additional external device.

24. The communication device of claim 14 wherein said at least one external device comprises at least one navigation device.

25. The communication device of claim 14 wherein said at least one external device comprises at least one weather device.

26. The communication device of claim 14 wherein said wireless module is operable to wirelessly communicate via said wireless module communication with more than one external device.

27. The communication device of claim 14 wherein said at least one user interface comprises at least one switch.

28. The communication device of claim 14 wherein said user interface is operable to execute functions of said at least one external device.

29. The communication device of claim 14 wherein said at least one user interface comprises more than one switch.

30. The communication device of claim 14 further comprising a display.

31. The communication device of claim 14 wherein said wireless module is operable to wirelessly communicate via said wireless module communication with at least one voice activated wireless device.

* * * * *